United States Patent [19]
Soto

[11] 3,854,438
[45] Dec. 17, 1974

[54] ACCIDENT PREVENTION DEVICE
[76] Inventor: Jose J. Soto, 3041 Edwin Ave., Fort Lee, N.J. 07024
[22] Filed: Mar. 29, 1973
[21] Appl. No.: 346,117

[52] U.S. Cl............ 116/28 R, 40/130 K, 240/1 EL, 350/96 B
[51] Int. Cl. ..................................................... B60q
[58] Field of Search......... 116/28 R, 114; 40/130 K, 40/129 C; 280/150; 240/1 EL; 350/96 B, 96 R

[56] References Cited
UNITED STATES PATENTS

| | | | |
|---|---|---|---|
| 1,729,274 | 9/1929 | Millar............................ | 116/28 R X |
| 2,198,443 | 4/1940 | Paul et al............................ | 240/8.41 |
| 3,553,467 | 1/1971 | Ramsey............................. | 350/96 R |
| 3,569,933 | 3/1971 | Longenecker et al........... | 240/8.4 X |
| 3,590,768 | 7/1971 | Shanok ............................. | 116/28 R |
| 3,624,816 | 11/1971 | Strack .............................. | 350/96 B |

Primary Examiner—Louis J. Capozi
Attorney, Agent, or Firm—Bernard Ouziel

[57] ABSTRACT

A light conducting material extends between a receiving surface on the front and a transmitting surface on the rear of a vehicle to provide immediate indication to a following vehicle of the illumination of brake lamps in the immediately preceding vehicle.

5 Claims, 6 Drawing Figures

PATENTED DEC 17 1974 3,854,438

ACCIDENT PREVENTION DEVICE

This invention relates to an optical accident prevention device and, more particularly, to an optical device for mounting longitudinally between the front and rear of a vehicle to provide an immediate rearward signal that the brake lamps in a forward vehicle have been illuminated.

All too frequently multiple chain-reaction type traffic accidents occur on high speed highways when one driver suddenly decelerates and this fact is not immediately communicated to following vehicles. Thus, for example, if the driver in one vehicle suddenly applies his brakes the driver in each succeeding vehicle will not apply his brakes until after he sees the illumination of the brake lamps in the car immediately before him. In this fashion, the driver of a third car in a chain is delayed in applying his brakes until after the lapse of reaction time of the driver in the second vehicle, and the driver in the fourth car in the chain is delayed by the sum of reaction times of the two drivers immediately preceding him. This delay becomes critical at high speeds where stopping time approximates driver reaction time.

In the past, various signaling systems have been devised to provide warning to drivers in a succession of cars that the driver of a lead vehicle has suddenly found it necessary to apply his brakes. One such arrangement is described in U.S. Pat. No. 3,210,726, granted to Copsy where an electroninc signaling system is shown. But this and other prior art signaling systems for this purpose are expensive, complex and subject to failure in the event of a malfunction of a mechanical or electrical part.

Accordingly, it is a general object of my invention to provide a simple, efficient, optical signaling device for preventing chain reaction type traffic accidents.

Briefly, in accordance with the principles of my invention, I provide in a vehicle a light conducting material extending longitudinally from a receiving surface in the front to a transmitting surface in the rear of a car. The light conducting material runs from front to rear along a convenient surface such as along the frame of the chassis or along the sides of the body of the car.

Further features, objects and advantages of my invention will become apparent upon consideration of the following detailed description in conjunction with the drawing in which.

Figure 1:
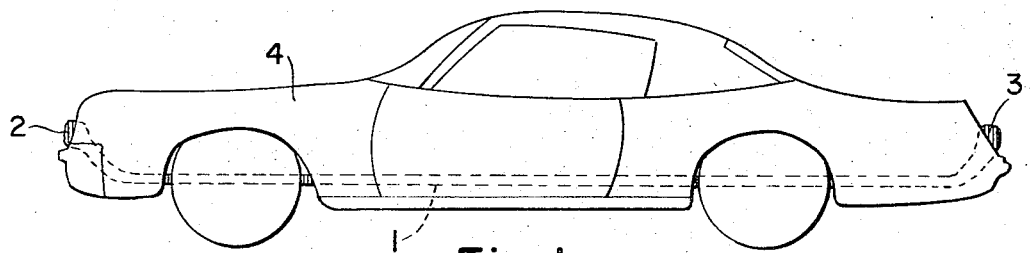
FIG. 1 is a side view of an automobile showing the light conducting material in phantom extending from the front to the rear.
Figure 2:
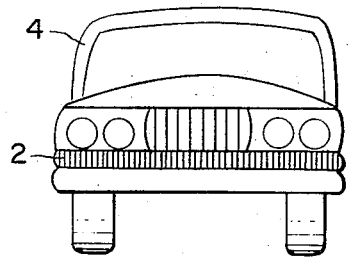
FIG. 2 is a front view of the vehicle showing the receiving surface of the light conducting material.
Figure 3:
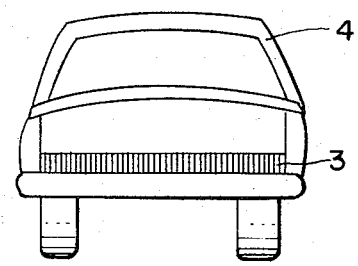
FIG. 3 is a rear view of the vehicle showing the transmitting surface of the light conducting material.
Figure 4:
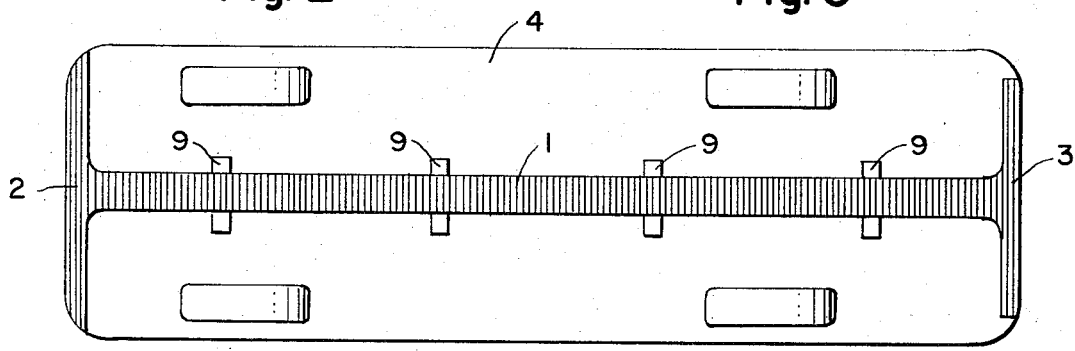
FIG. 4 is a bottom view of the vehicle showing the light conducting material running longitudinally along the chassis.
Figure 5:
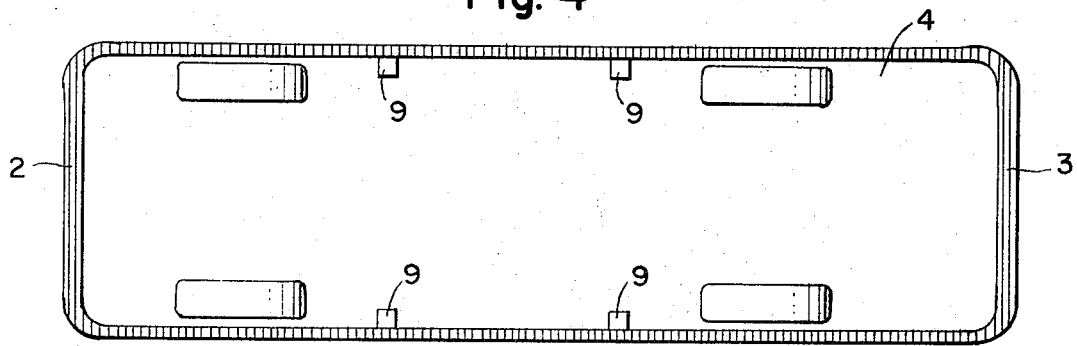
FIG. 5 is a bottom view of the vehicle showing another embodiment of the invention in which the light conducting material runs longitudinally along the sides of the body of the car.

Referring now to the drawing there is a light conducting material 1 such as a fiber optic bundle or a lucite plastic member extending continuously from a receiving surface 2 at the front of the car 4 along the bottom to a transmitting surface 3 at the rear of car 4. The light conducting material may run from the front to the rear along the chassis of the car as shown in FIG. 4 or along the interior side of the body of the car as shown in FIG. 5. The receiving end 2 and transmitting end 3 may be placed directly over the front and rear bumpers, respectively, as shown in FIGS. 2 and 3.

The light conducting material may be a shaped piece of lucite or other transparent plastic that is concave at receiver 2 to maximize the collection of light and contoured to the chassis or sides of the car, as the case may be, to the area of the rear bumper. The entire length of the lucite may be covered with an opaque veneer such as a plastic paint or tape, except of course, for the receiving area 2 and transmitter area 3. Alternatively, the light conducting material may be composed of a bundle of fiber optic members made from any suitable combination of light conducting materials such as flexible glass fibers or the type manufactured by E. I. duPont de Nemours and Company under the trademark Crofon. The fiber optic members are flexible and may be bent to the individual contours of a particular car. Suitable straps 9 are provided along the length of the light conducting material 1 to hold it in place.

Figure 6:
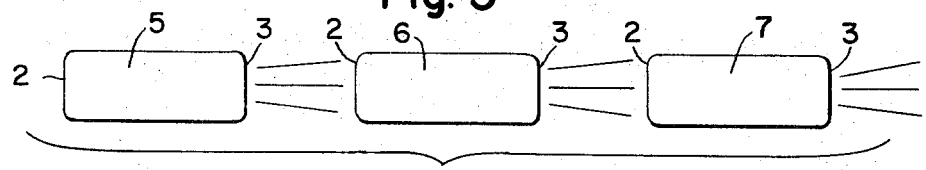
FIG. 6 is a schematic plan view of a succession of vehicles travelling one behind the other on a highway.

As shown in FIG. 6, when the driver of a lead car 5 applies his brakes to illuminate his brake lamps, the light produced is received at receiver 2 of car 6 and transmitted immediately to transmitter 3 of car 6 from which it is received by the driver of car 7. Simultaneously, the light from the brake lamps on car 5 are received at the receiver 2 of car 7 and transmitted on down the line through the transmitter 3 of car 7 and so forth. In this fashion, every driver in a chain of cars immediately receives knowledge that the driver in the lead car has applied his brakes; all drivers can thus immediately take corrective action without having to suffer the cumulative delay of the reaction time of the drivers earlier in the chain.

It is understood that the above-described arrangements are illustrative of the application of the principles of the invention. Numerous other arrangements may be devised by those skilled in the art without departing from the spirit and scope of the invention.

What I claim is:

1. In combination with a vehicle, an accident prevention device comprising a longitudinally extending light conducting material having a front end portion fitted on the outside front of said vehicle and a rear end portion fitted on the outside rear of said vehicle, said front end portion having a contoured surface for collecting impinging light originating from a forward vehicle and transmitting said light through the length of said light conducting material, and said rear end portion having a contoured surface for transmitting light collected at said front end portion to a following vehicle.

2. An accident prevention device in accordance with claim 1 wherein said light conducting material is contoured to run along the chassis of said vehicle.

3. An accident prevention device in accordance with claim 1 wherein said light conducting material is contoured to run along the interior side of the body of said vehicle.

4. An accident prevention device in accordance with claim 1 wherein said light conducting material is a fiber optic bundle.

5. An accident prevention device in accordance with claim 1 wherein said light conducting material is a translucent plastic having an opaque veneer.

* * * * *